United States Patent [19]

Daudelin

[11] Patent Number: 4,918,719
[45] Date of Patent: Apr. 17, 1990

[54] ELIMINATION OF FALSE REQUESTS FOR TELEPHONE OPERATOR ASSISTANCE

[75] Inventor: Abraham N. Daudelin, Colts Neck, N.J.

[73] Assignee: American Telephone and Telegraph Company, N.Y.

[21] Appl. No.: 283,057

[22] Filed: Dec. 2, 1988

Related U.S. Application Data

[63] Continuation of Ser. No. 916,611, Oct. 8, 1986, abandoned.

[51] Int. Cl.$^4$ .................... H04M 11/00; H04M 11/10
[52] U.S. Cl. ........................................ 379/67; 379/84; 379/214; 379/393
[58] Field of Search .................. 379/74, 77, 80, 81, 379/84, 67, 88, 89, 190, 191, 92, 203–205, 213, 214, 265, 266, 393, 162, 163

[56] References Cited

U.S. PATENT DOCUMENTS

| | | | |
|---|---|---|---|
| 3,335,231 | 8/1967 | Gray et al. | 379/81 |
| 3,989,901 | 11/1976 | Neuwirth et al. | 379/74 |
| 4,071,698 | 1/1978 | Barger, Jr. et al. | 379/84 |
| 4,451,704 | 5/1984 | Winkelman | 379/367 |
| 4,540,856 | 9/1985 | Fujii et al. | 379/77 |
| 4,608,460 | 8/1986 | Carter et al. | 379/84 |
| 4,670,628 | 6/1987 | Boratgis et al. | 379/77 |
| 4,677,609 | 6/1987 | Piereth et al. | 370/60 |

OTHER PUBLICATIONS

S. D. Hester et al., "The AT&T Multi-Mode Voice Systems—Full Spectrum Solutions for Speech Processing Applications", *Proceedings of the 1985 AVIOS Conference.*

Primary Examiner—Steven L. Stephan
Assistant Examiner—James E. Tomassini
Attorney, Agent, or Firm—Werner Ulrich

[57] ABSTRACT

A problem has been encountered in directory assistance and intercept systems which provide automatic announcement facilities to announce a directory number or line status to a customer and which permit the customer to be subsequently connected to an operator if the announcement is unsatisfactory. In such systems, if the customer disconnects and immediately attempts to place another call, such a situation may be interpreted by the local switching system serving the customer as a "flash"; if the customer is provided with three-way calling then the connection to the directory assistance or intercept system is put into a hold state while the customer dials a new number. In the meantime, the directory assistance or intercept system, not being aware of the hold status of the connection to the customer, sets up a connection to an assistance operator who hears nothing. This "no voice" connection is costly and annoying to the assistance operator. No voice connections are eliminated by checking for a positive voice signal or for a positive keyed command signal using a voice processing unit following an announcement and prior to setting up a subsequent connection to an assistance operator. If no positive keyed command or voice signals are detected, the call is disconnected and the no voice connection to an assistance operator is eliminated.

2 Claims, 5 Drawing Sheets

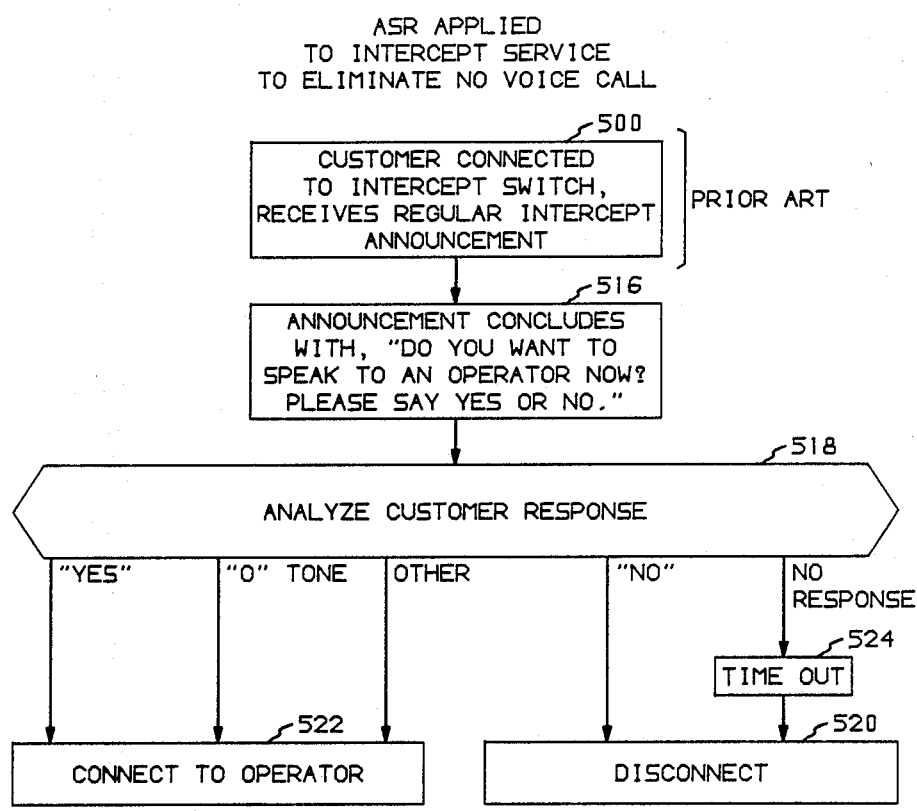

ELIMINATION OF FALSE REQUESTS FOR TELEPHONE OPERATOR ASSISTANCE

This application is a continuation of application Ser. No. 916,611, filed on Oct. 8, 1988, now abandoned.

CROSS-REFERENCE TO RELATED APPLICATION

This application is related to the application of A. N. Daudelin 4 entitled "Directory Assistance Call Processing And Non-Supervisory Signal Monitoring Arrangements" Ser. No. 916,615, filed Oct. 8, 1986, now abandoned which application is assigned to the assignee of the present application, and is being filed concurrently herewith on Oct. 8, 1986.

TECHNICAL FIELD

This invention deals with telecommunications operator service systems and specifically with the use of automatic voice recognition techniques to enhance performance of such systems.

PROBLEM

Many modern directory assistance systems and intercept systems have facilities for automatically announcing a number to a telephone customer. These facilities are backed up by a connection to an operator in case the customer is confused or needs additional information.

A problem has been encountered in offering service in this manner. Under some circumstances, an operator will be defectively connected to a passive hold circuit, and will not communicate with a customer. This condition is brought about in the following manner. After the customer has received an announcement of a number, the customer will generally disconnect and will frequently wish to place a call almost immediately. If the customer's disconnect signal is only a very brief depression of the customer's station switch hook, this brief depression is interpreted by the customer's switching system or switch as a "flash". If the customer has three-way calling service, the flash is interpreted as an add-on service request to dial the number of a third party to be added to a connection. Although "stuttered" dial tone is returned to the calling customer to warn the customer that this is an add-on service request, if the calling customer does not recognize the stuttered dial tone and proceeds to dial because he thinks he has disconnected and is initiating a new call, the connection to the directory assistance or intercept system is maintained in a hold state due to the "flash" signal and the customer dialing. Since the directory assistance or intercept system does not detect a customer disconnect signal even after the announcement has been repeated, the directory assistance or intercept system assumes that the customer wants to be connected to an operator and sets up a connection to such an operator. The operator is then defectively connected, not to a customer, but to a passive circuit used to maintain a hold connection, and when that operator tries to talk to a customer, no response is heard. This condition, which is referred to as a "no voice" connection, is very annoying to the operator and is expensive because it uses valuable operator work time.

SOLUTION

The above problem is solved and an advance is made in the art in accordance with my invention wherein in a telecommunications switching system, after a customer has received an announcement, a voice processing unit monitors a communication link connected to that customer for a predetermined interval to detect non-supervisory signals representing customer commands for further processing a call. The customer is disconnected to preclude a "no voice" call if the voice processing unit does not recognize a non-supervisory signal, such as a spoken command by the customer or tones keyed on a dual tone multifrequency (DTMF) customer station, within that interval. Advantageously, this sharply reduces the number of undesirable "no voice" connections to an assistance operator.

A voice detection unit is connected to the customer station after that customer receives an announcement such as: "Please say 'yes' if you wish to be connected to an operator." Absence of voice or tones or presence of a negative command signal is then interpreted as an indication that no such connection is required and the calling customer is disconnected. Advantageously, this permits customers to have more rapid access to an assistance operator while sharply reducing the number of undesirable "no voice" connections.

In some installed automatic call distribution (ACD) systems used for providing directory assistance or automatic intercept service, a trunk circuit is used for connecting a customer to an announcement machine and to an operator. This trunk circuit is modified according to the principles of the invention to provide access to and control from a voice processing unit. The modified trunk circuit permits a non-supervisory signal from the customer station to be recognized by the voice processing unit and permits the voice processing unit to control a subsequent connection from the customer to an operator. Advantageously, such an arrangement permits such installed automatic call distribution equipment to be economically modified to avoid most "no voice" connections.

BRIEF DESCRIPTION OF THE DRAWING

FIG. 5 is a flow chart of programs for controlling an automatic intercept system in such a way as to avoid setting up connections from an intercept operator to a "no voice" trunk.

DETAILED DESCRIPTION

Figure 1:
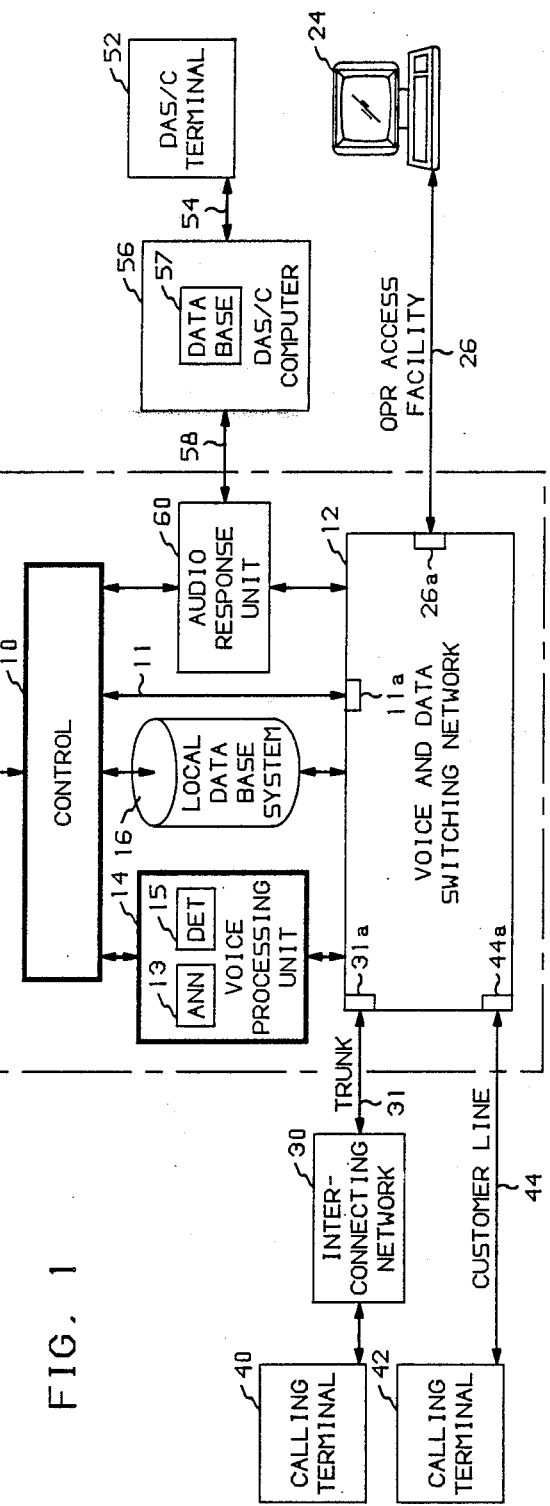
FIG. 1 is a block diagram of a telecommunications switch and auxiliary facilities adapted to offer directory assistance service including a control unit and a voice processing unit shown in heavy outlines to indicate that these units include the modifications over the prior art to practice the present invention.

In FIG. 1, block 1 represents a telecommunications switching system or switch operating under stored program control and having within it the elements necessary for practicing the invention. Switch 1 is a switch such as the 5ESS TM switch manufactured by AT&T Technologies, Inc., arranged to offer the Operator Services Position System (OSPS) features. The 5ESS switch is described, for example, in *AT&T Technical Journal*, v. 64, no. 6, part 2, pp. 1305-1564, and the OSPS feature is described, for example, in Paper 3, Session 22C presented at the International Switching Symposium in Florence, May 1984.

Within switch 1 are various blocks for carrying out the functions of a telecommunications switch. Control 10 is a distributed control system operating under the control of a group of data and call processing programs to control various blocks of the switch. In order to practice the present invention for directory assistance systems, the operator services control programs must be augmented by programs described in the flow charts of FIG. 2. Block 12 is a voice and data switching network capable of switching voice and/or data between inputs connected to the switching network. Connected to the network 12 is voice processing unit 14. Input communication links to the switching network are connected at input ports identified by the number of the connected input with the letter "a" appended. Unit 14 receives a non-supervisory input signal which in the present embodiment may be either voice or a dual tone multifrequency (DTMF) signal from a calling terminal and analyzes such signals to distinguish among the various allowable DTMF signals and among the individual elements of a predetermined list of spoken responses. Unit 14 also generates tones and voice messages to prompt a customer to speak or key information into the system for subsequent recognition by the voice processing unit. Unit 14 generates an output data signal, representing the result of the voice processing; this output signal is sent to control 10 and is used as an input to the program for controlling establishment of connections in switching network 12 and for generating displays for operator position 24. Voice processing unit 14 includes announcement circuits 13 and detection circuits 15 both controlled by a controller of voice processing unit 14. In alternate configurations, the announcement and detection circuits could be separate and separately controlled. The Conversant TM 1 Voice System, Model 80, manufactured by AT&T Technologies, Inc., is one unit which can be used to carry out the functions of voice processing unit 14.

Data base system 16 is used by switch 1 in order to control calls. Data base system 16 is directly accessible by control 10 and via switching network 12.

Operator position 24 connected to switch 1 comprises a terminal for use by an operator in order to control operator assistance calls. Data displays for the terminal of operator position 24 are generated by control 10. Operator position 24 is connected to switching network 12 by operator access facility 26, which may include carrier facilities to allow the operator position to be located far from switching network 12 or may be a simple voice and data access facility if the operator positions are located close to the switching network. Only one operator position is shown in FIG. 1 but it is understood that a typical switch, arranged to offer operator assistance services, has access to a large number of such operator positions.

Connected to switch 1 is interconnecting network 30. This network may include one or more switches and is used for interconnecting voice and data signals between customer terminals and switch 1. Also connected to switch 1 are customer lines, including customer line 44, for connecting a calling terminal 42 to switch 1. The word "terminal" as used herein includes a simple customer telephone station, a customer station with more elaborate features such as magnetic strip card readers, or a customer voice/data terminal. Calling terminal 40 is connected through interconnecting network 30 to switch 1. Calls are connected to switch 1 via communication links such as trunk 31 and customer line 44. In this example, calling terminal 40 is connected by a customer line to a 1A ESS TM switch, a switch offering local service manufactured by AT&T Technologies, Inc., and that switch is connected to trunk 31 which is connected to switch 1.

In order to handle directory assistance service, the system is further augmented by a directory assistance computer (DAS/C) 56 and a DAS/C terminal 52. The directory assistance operator has access to two separate operator terminals: terminal 24 previously described and terminal 52 used for communicating via data link 54 with DAS/C computer 56. The DAS/C computer has an extensive data base 57 and is used for making the searches required to be responsive to directory assistance requests. The DAS/C computer is connected via data link 58 to an audio response unit (ARU) 60 which is connected to the voice and data switching network 12. A typical DAS/C computer is manufactured by Computer Consoles, Inc., (CCI) who also manufactures an audio response unit and a DAS/C terminal. The operator at terminals 24 and 52 communicates orally with a customer and on the basis of these communications keys information into the DAS/C terminal 52 for transmission to the DAS/C computer 56. The DAS/C computer 56 responds to such keyed information by generating displays of information on DAS/C terminal 52 which information may include the desired directory number. In case the customer does not give enough information to locate a valid listing, the customer will not be connected to an audio response unit since there is nothing to announce. However, if the operator ascertains from oral communications with a customer that the desired number or listing has been displayed, the operator signals to the DAS/C computer with additional keyed information to identify the correct listing, and a directory number or a statement that the number is not published is then announced to the customer through the audio response unit 60, the operator in the meantime being dropped from the connection. In an alternative embodiment, terminals 24 and 52 are a single terminal and the DAS/C computer is accessed via the operator access facility 26 and network 12, and the audio response unit (ARU) 60, which is combined with voice processing unit 14, is accessed by DAS/C via network 12.

Trunk 31, customer line 44 and operator access facility 26 are connected to network 12 at input ports 31a, 44a and 26a respectively, and control 10 is connected via channel 11 at input port 11a.

Voice processing unit 14 of FIG. 1 is used for the detection of customer commands but not for the purpose of announcing directory numbers. This is done for convenience since an existing system is available using a DAS/C computer and an associated audio response unit 60. A voice processing system such as the previously mentioned Conversant system can perform both the monitoring and the announcement functions so that in an alternative configuration, units 60 and 14 of FIG. 1 are merged into a single voice processing system. As shown, however, unit 14 comprises announcement circuits 13 for making prompting or other announcements to the customer.

In the prior art system, "no voice" connections may be set up. If the calling customer who requested the directory assistance chooses to wait after having received the desired directory number from the audio response unit, that customer can be reconnected to a directory assistance operator. If, therefore, that customer disconnects but does so with such a short depression of the switchhook that this is interpreted by another local switch, such as the 1A ESS switch connected to customer terminal 40, as a flash instead of a disconnect, then the "no voice" connection is established: the customer is connected in his local switch to a digit receiver in order to dial the number for connection to a third leg of an add-on call while a hold is placed on the connection to the system containing the directory assistance operator; switch 1 interprets the failure of the calling customer to disconnect as a request to be reconnected to a directory assistance operator who is connected only to the hold circuit, i.e., a "no voice" connection.

To eliminate the "no voice" connection, the prior art system is modified according to the principles of this invention. In the modified system of FIG. 1, after the customer has received the announcement from an audio response unit 60, the customer is connected to voice processing unit 14. Voice processing unit 14 transmits an announcement to the calling customer asking if the customer wishes to be reconnected to a directory assistance operator and asking the customer to say "yes" or "no". The customer who wishes to be reconnected to an operator says "yes" and is so connected. If the "no voice" condition in fact exists, then the voice processing unit detects no response and simply causes the connection to the customer to be disconnected.

Figure 2:
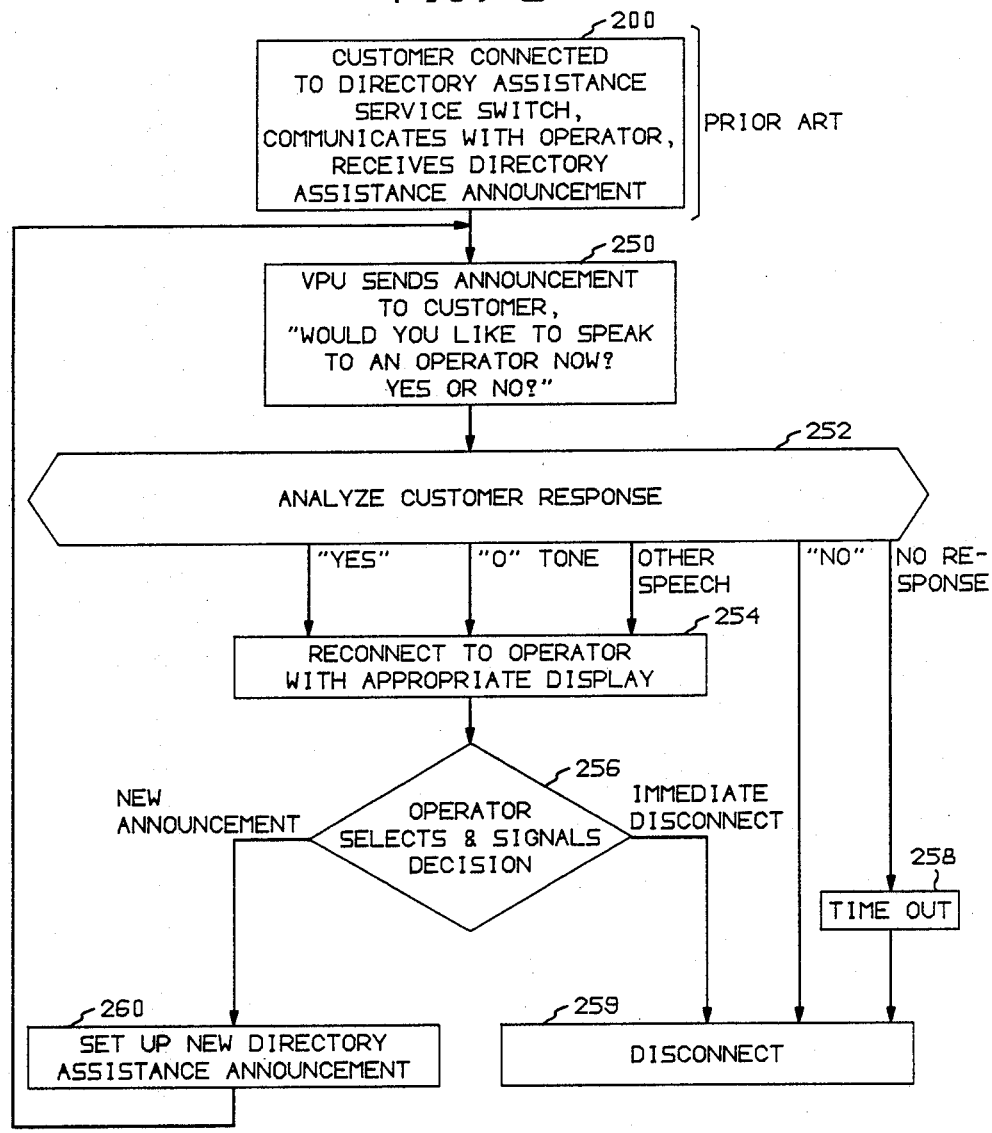
FIG. 2 is a flow chart of programs for controlling such a switch to offer directory assistance service without connecting operators to "no voice" trunks.

FIG. 2 is a flow chart of programs for avoiding "no voice" call connections on directory assistance connections and for controlling the automatic setup of a call to the requested directory number. Action block 200 indicates the prior art steps for connecting a customer to a directory assistance service switch, having that customer communicate with the operator to locate a directory assistance listing and having the customer receive a directory assistance announcement representing the result of the search for such a listing. The other blocks of FIG. 2 represent departures from the prior art in order to implement the present invention.

The voice processing unit sends an announcement to the customer: "Would you like to speak to an operator now, 'yes' or 'no'" (action block 250). The customer's response is analyzed in decision block 252. If the customer says "no" or gives no response within a preselected timeout interval (action block 258) the customer is disconnected (action block 259). If the customer says "yes", presses the zero button on a DTMF station, or says something else other than "no", an operator is reconnected (action block 254). That operator would have a display indicating the listing which had been announced to the customer and the information that the initial operator had entered into the DAS/C computer to retrieve that listing. Consistent with the prior art, the operator may elect to requery the data base if the customer requests additional information, or may disconnect. Following an additional query, the operator decides on the next action (decision block 256). The operator may signal for an immediate disconnect (action block 259) or may request a new directory assistance announcement (action block 260). Following the new directory assistance announcement, action block 250, previously described, is reentered.

Figure 3:
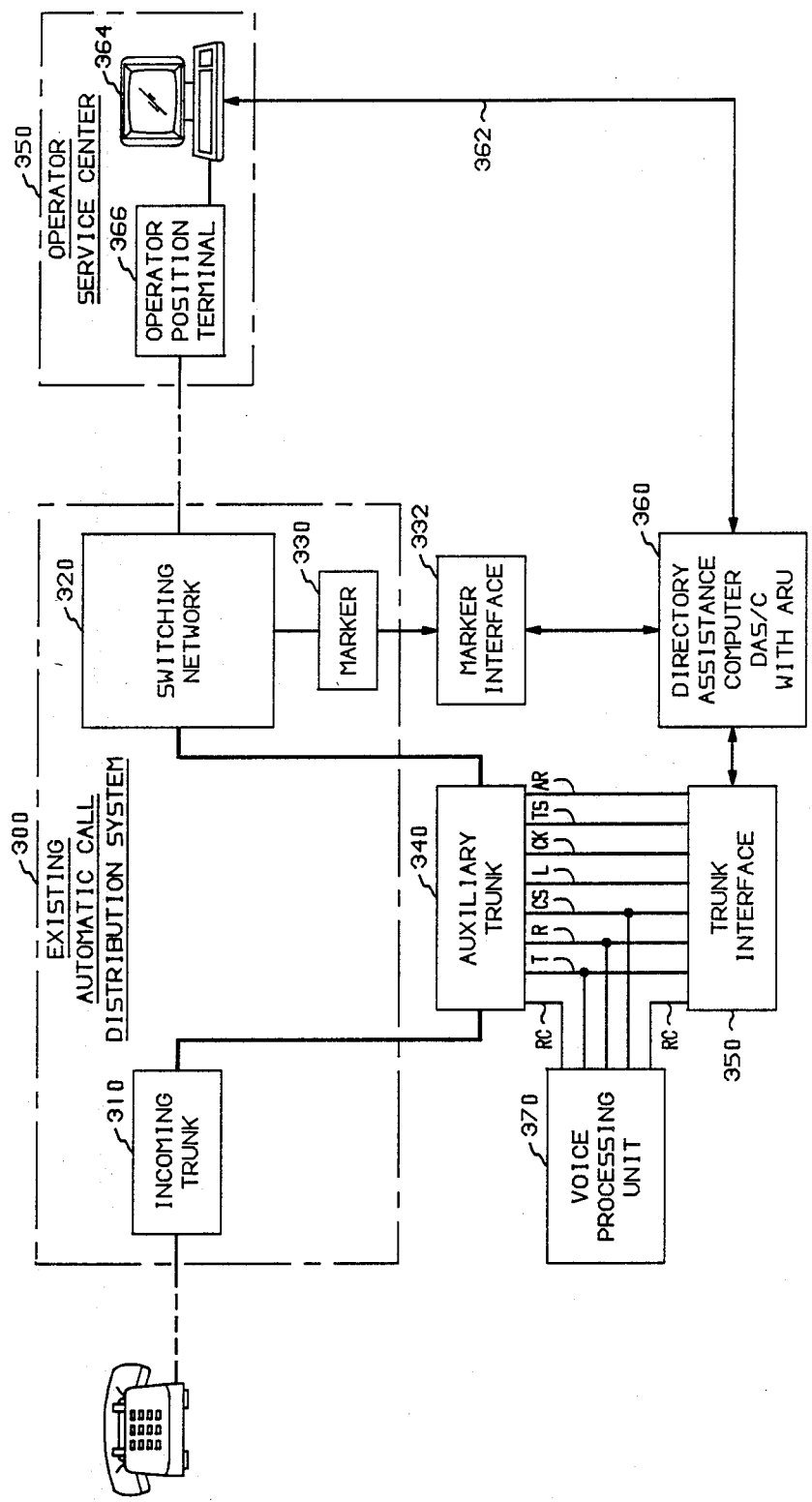
FIG. 3 is a block diagram of an ACD system arranged to offer directory assistance service and modified to avoid connecting operators to "no voice" trunks.

FIG. 3 illustrates an alternative embodiment of the present invention for use with existing and installed systems such as the No. 5 Crossbar Automatic Call Distributor (ACD) manufactured by AT&T Technologies, Inc., or similar systems used for offering directory assistance service. The configuration of FIG. 3 can be used for eliminating "no voice" connections. Block 300 is an existing No. 5 Crossbar ACD. The system is connected to an operator service center 350 which is functionally part of the automatic call distribution system, but in practice is normally located remotely. The automatic call distribution system is adapted to offer directory assistance service through the use of a plurality of auxiliary trunks such as auxiliary trunk 340 which may be inserted between incoming trunks such as incoming trunk 310 and the automatic call distribution system switching network 320. Additionally, a marker interface 332 is provided as an interface between the marker 330 of the existing No. 5 Crossbar ACD and a directory assistance computer DAS/C 360. The DAS/C 360 is similar to the DAS/C 56 of FIG. 1 but also includes an automatic response unit similar to block 60 of FIG. 1. The DAS/C 360 is connected to a trunk interface 350 which interfaces between the DAS/C and the auxiliary trunk 340. The DAS/C 360 is also connected via data link 362 with operator terminals such as DAS/C terminal 364 at each operator station. Terminal 364 also communicates with an operator position terminal 366, used for communicating with ACD 300, in order to allow a single disconnect signal from the DAS/C terminal to be used as a disconnect signal to both the DAS/C 360 and the switching network 320 and to allow traffic data from the operator terminal to be transmitted to the DAS/C for subsequent analysis.

In order to introduce a voice processing unit 370 into the system for the purpose of recognizing the "no voice" condition, it is necessary to tap into the tip and ring (T and R) leads of the auxiliary trunk 340 which carry the voice signal from the customer. It is also necessary to intercept the RC (reconnect) lead from the auxiliary trunk 340. The reconnect signal is used to signal to the auxiliary trunk 340 that the incoming trunk associated with the auxiliary trunk is to be reconnected to an operator. By intercepting the RC lead, voice processing unit 370 is able to control the auxiliary trunk 340 to defer or eliminate reconnection according to the voice signals recognized by voice processing unit 370. In addition, voice processing unit 370 is connected to a reconnect lead to trunk interface 350 for the purpose of signaling DAS/C computer 360 that a reconnection has in fact been requested. In addition, voice processing unit 370 monitors lead CS (customer supervision) which indicates the presence or absence of a customer connected to the auxiliary trunk 340. An auxiliary trunk for a No. 5 Crossbar ACD adapted to offer directory assistance service is described in U.S. Pat. No. 4,451,704, issued May 29, 1984 to M. Winkelman, entitled "Switching System Auxiliary Line Transfer Circuit".

Figure 4:
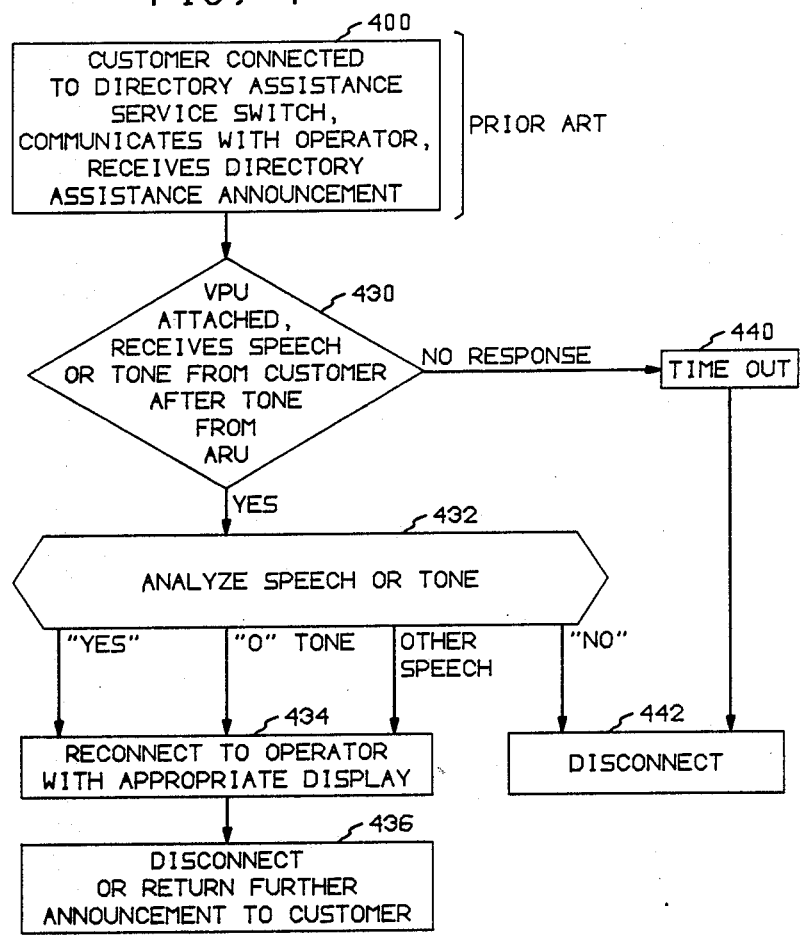
FIG. 4 is a flow chart of the process of setting up directory assistance connections without setting up "no voice" connections to an operator in the ACD system of FIG. 3.

FIG. 4 is a flow chart of the process of providing directory assistance service from a No. 5 Crossbar ACD to eliminate "no voice" calls. First a customer is connected to an operator position to receive directory assistance service, and the customer receives a directory assistance announcement, in conformity with prior art actions (action block 400). In accordance with this invention, the directory assistance announcement ends with a question "Would you like to speak to an operator now, yes or no?" followed by a unique tone to activate the voice processing unit 370 to listen for the customer response. The voice processing unit is activated for detecting speech or tone from the customer (decision block 430). If the voice processing unit detects no response prior to a predetermined timeout interval (action box 440) the calling customer is disconnected (action box 442). This eliminates a reconnection to an operator for a "no voice" call. If the voice processing unit detects speech or tone from a customer, this speech or tone is analyzed (decision block 432). If a "no" is detected from the customer then the customer is disconnected (action block 442). Otherwise, if a "yes", the tone combination of zero keyed from a DTMF set, or other speech is detected, then an operator is reconnected, and provided from DAS/C 360 with a display showing the previously retrieved listing and the data that the previous operator had used to retrieve that listing. The customer and the newly connected operator then have a further verbal exchange after which the operator either disconnects the customer or keys in a request for further display information and a possible further announcement to the customer (action block 436).

In this specific embodiment of the invention, the system of FIG. 1 also offers automatic intercept service. Switch 1 offers such intercept service for calls to directory numbers directly served from switch 1 or for calls to a directory number served by an intermediate switch in interconnecting network 30 where that intermediate switch is in the region that uses switch 1 to provide automatic intercept service. In the latter case, a call is received at the intermediate switch and that intermediate switch forwards the dialed directory number over trunk 31 to switch 1 along with an indication that this was an intercept call. This number is then analyzed under the control of control 10 using data in local data base system 16 which has the records required for intercept. When the preselected number corresponding to the intercepted number is found, this number is announced to the calling customer over trunk 31 using audio response unit 60.

Automatic intercept service also has the characteristic that if the customer stays on the line after receiving the intercept message, that customer is then connected to an operator. Therefore, the same "no voice" problems previously described for directory assistance calls exist for intercept calls. In order to eliminate "no voice" calls for intercept calls, the voice processing unit 14 is attached to trunk 31 and monitors for a response after prompting the customer to indicate whether the customer wishes to be connected to an operator. These actions are described in the flow chart of FIG. 5.

An intercept system returns an announcement to the calling customer, giving the status of the called directory number. Some examples of announcements returned to the calling customer are the following:

"The number you have reached, 555-1234, has been changed to 555-1278";

"The number you have reached, 555-1234, is temporarily out of service";

"The number you have reached, 555-1234, has been disconnected";

"The number you have reached, 555-1234, is a working number; please try again".

Action block 500, representing prior art intercept call actions, indicates that when a customer dials an apparently non-working number, the customer is routed to the intercept system and receives a regular intercept announcement. In accordance with this invention, a further announcement such as "Do you want to speak to an operator now? Please say 'yes' or 'no'" is appended to the regular announcement (action box 516). The response of the customer to this announcement is analyzed in decision block 518. If the customer says "no" the customer is disconnected (action box 520). If the customer makes no response (this includes the "no voice" condition) then after a timeout (action box 524) the customer is disconnected (action box 520). If the customer says "yes", keys the zero button on the DTMF station, or makes some other verbal response, then the customer is connected to an operator (action box 522).

As previously discussed, a voice processing unit can be arranged to recognize the tones generated by a dual tone multifrequency (DTMF) customer station. Such tones can be used to represent commands. For example, key 9 (which includes the letter Y for "yes") and key 6 (which includes the letter N for "no") can be used as alternatives to oral "yes" and "no" indications. The system responds to such tones keyed by the customer in the same way as it responds to a spoken "yes" or "no".

The telecommunications switching systems described herein do not include telephone answering machines which only serve to connect an incoming call to a recording machine, but which lack the ability characteristic of a telecommunications switching system, to flexibly interconnect a plurality of input ports with output ports or with each other.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In an assistance switching system connected by an interoffice trunk to a local switching system, a method of controlling a telephone connection, comprising the steps of:
   in said assistance switching system, connecting said interoffice trunk by switched access to one of a plurality of operator positions;
   in said assistance switching system, responsive to receipt of a signal from said operator position, disconnecting said trunk from said operator position and connecting said interoffice trunk by switched access to an announcement system for announcing a message comprising one of a plurality of numbers;
   announcing from said assistance switching system over said interoffice trunk a message defining a spoken command for requesting connection of said interoffice trunk to an operator position;
   in said local switching system, responsive to receipt of a "flash" signal from a customer station, changing a state of said interoffice trunk to "hold" in said local switching system;
   determining in said assistance switching system if said interoffice trunk is in the "hold" state in said local switching system said determining comprising the step of monitoring said communication link for detecting said spoken command over a predefined interval of time, and if said command is not detected during said predetermined interval of time, said interoffice trunk is determined to be in said "hold" state in said local switching system, and if said command is detected during said predetermined interval, said interoffice trunk is determined not to be in said "hold" state in said local switching system;

if said interoffice trunk is determined to be in said "hold" state in said local switching system, disconnecting said interoffice trunk in said assistance switching system; and if said interoffice trunk is determined not to be in said "hold" state in said local switching system, connecting said interoffice trunk to any of said plurality of operator positions.

2. The method of claim 1 wherein said monitoring step comprises the step of monitoring said communication link over said predetermined interval of time, using speech recognition techniques, for recognizing said spoken command.

* * * * *